United States Patent
Saito (10) Patent No.: US 7,159,452 B2
(45) Date of Patent: Jan. 9, 2007

(54) METHOD FOR MEASURING A CONFIGURATION OF AN OBJECT

(75) Inventor: Akinori Saito, Veenendaal (NL)

(73) Assignee: Mitutoyo Corporation, Kawasaki (JP)

( * ) Notice: Subject to any disclaimer, the term of this patent is extended or adjusted under 35 U.S.C. 154(b) by 99 days.

(21) Appl. No.: 10/655,292

(22) Filed: Sep. 4, 2003

(65) Prior Publication Data
US 2004/0040373 A1    Mar. 4, 2004

Related U.S. Application Data

(63) Continuation of application No. 10/266,359, filed on Oct. 8, 2002, now Pat. No. 6,675,637.

(30) Foreign Application Priority Data

Oct. 10, 2001    (JP)    ............... 2001-312927

(51) Int. Cl.
 *G01B 5/28*    (2006.01)
 *B23Q 17/09*    (2006.01)
(52) U.S. Cl. .......................... 73/105; 73/104
(58) Field of Classification Search ................. 73/104, 73/105
See application file for complete search history.

(56) References Cited

U.S. PATENT DOCUMENTS

| 5,025,658 | A | * | 6/1991 | Elings et al. ................. | 73/105 |
| 5,260,572 | A |   | 11/1993 | Marshall | |
| 5,267,471 | A | * | 12/1993 | Abraham et al. ............. | 73/105 |
| 5,652,377 | A |   | 7/1997 | Yagi | |
| 5,801,381 | A |   | 9/1998 | Flecha et al. | |
| 5,907,096 | A |   | 5/1999 | Chen | |
| 6,005,246 | A |   | 12/1999 | Kitamura et al. | |
| 6,006,593 | A | * | 12/1999 | Yamanaka ................... | 73/105 |
| 6,079,254 | A | * | 6/2000 | Chen et al. ................... | 73/105 |
| 6,666,075 | B1 | * | 12/2003 | Mancevski et al. .......... | 73/105 |

FOREIGN PATENT DOCUMENTS

| JP | 2001-99639 | | 4/2001 |
| JP | 2001099639 | * | 4/2001 |

\* cited by examiner

*Primary Examiner*—Hezron Williams
*Assistant Examiner*—Ryan Christensen
(74) *Attorney, Agent, or Firm*—Rankin, Hill, Porter & Clark LLP

(57) ABSTRACT

A touch sensor 10 having a stylus 12 with a tip 12A making contact with a test piece W has an operational control structure including an oscillator 3 which oscillates the stylus 12 in the axial direction; a detecting circuit 4 which detects changes of oscillation of the stylus 12; an adjustor unit 5 which removes noise added to an output signal from the detecting circuit 4; a fine motion mechanism controller 6 which controls the operation of a fine motion mechanism 21 in such a manner that the change of the quantity of state of the detection signal is maintained constant; and a PZT driver 7 which operates the fine motion mechanism 21. The measuring force during surface configuration measurement can be adjusted by adjusting an alternating signal to be applied to the touch sensor or by reducing the noise added to the detection signal without making modifications to a shape or structure of the touch sensor.

13 Claims, 7 Drawing Sheets

METHOD FOR MEASURING A CONFIGURATION OF AN OBJECT

CROSS REFERENCE TO RELATED APPLICATION

The present application is a continuation of U.S. patent application Ser. No. 10/266,359, filed Oct. 8, 2002, now U.S. Pat. No. 6,675,637 the entirety of which is hereby incorporated by reference.

BACKGROUND OF THE INVENTION

1. Field of the Invention

The present invention relates to a touch sensor for a probe, which, for example, is used when measuring micro-configuration of the surface of a test piece by equipment such as a micro-configuration measuring device and a surface roughness measuring device or inner configuration of a hole by a small hole measuring device.

2. Description of the Related Art

Conventionally, micro-configuration measuring devices are used when examining a test piece for research and development purposes as well as for production activities in the fields of precision machining or semiconductor manufacturing. The device measures micro-dimensions such as a surface roughness or a step on the machined surface and a thickness of a thin film by a vertically oscillating a stylus, which is brought in contact with and moved about the test piece. The change in the vertical oscillation of the stylus is then converted into an electrical signal to be read.

One example of such a mechanism involving a stylus used in micro-configuration measuring devices as described above is a touch sensor, which is disclosed in Japanese Patent Laid Open No. 2001-91206.

Figure 6:
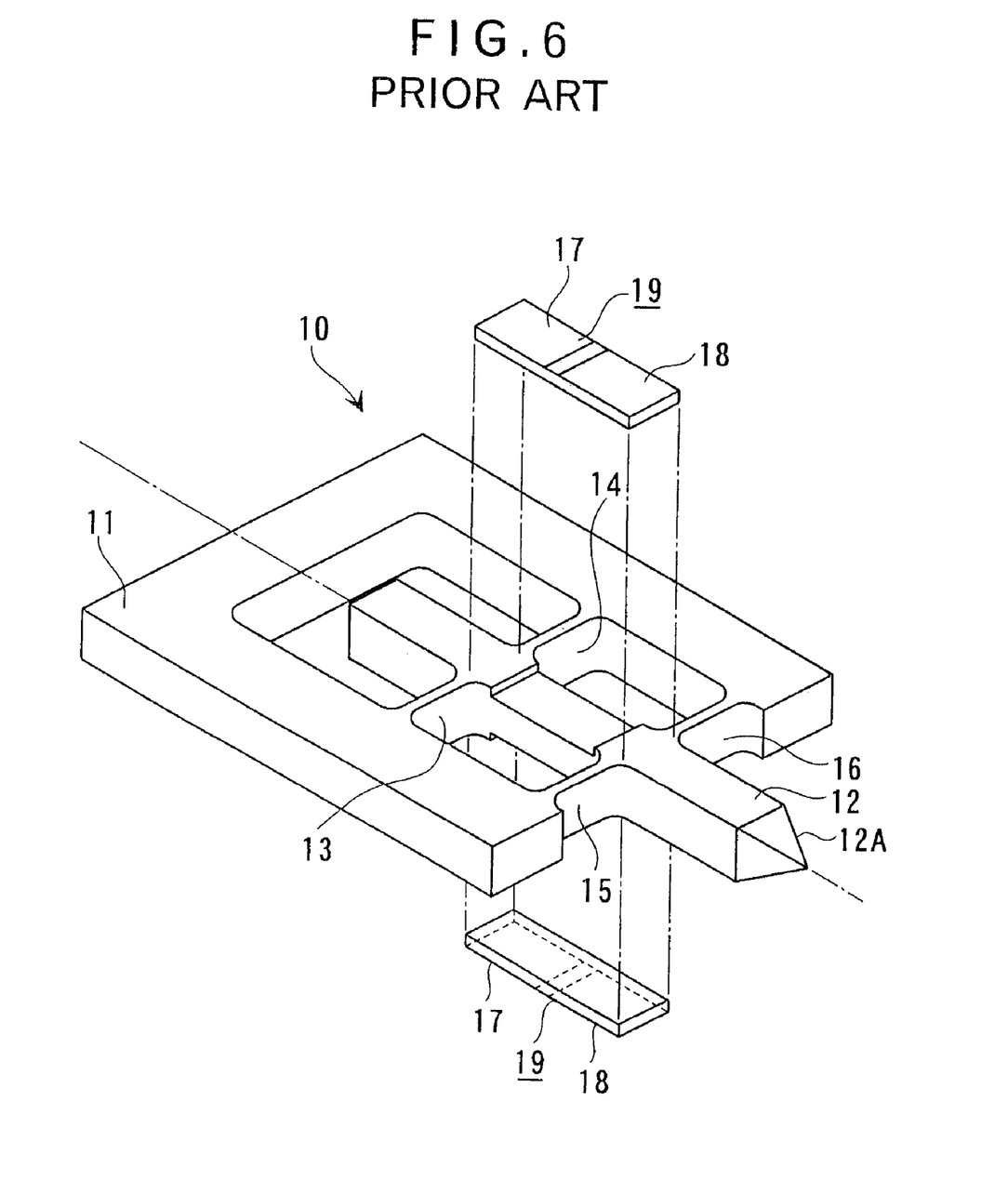
FIG. 6 is a schematic diagram in perspective illustrating the structure of a conventional touch sensor.

In FIG. 6, this touch sensor 10 includes a stylus holder 11, a stylus 12 which is held by arms 13, 14, 15 and 16 and has a tip 12A making contact with the test piece, and a couple of piezoelectric elements 19, one of which is attached to the stylus on one side and the other of which on the side opposite thereto. Each piezoelectric element 19 is made of two parts, one being an oscillation means 17 and the other a detection means 18, joining at the center.

Given such a structure, if an electrically alternating signal of an appropriate oscillation frequency is applied to the oscillation means 17, then the stylus 12 starts oscillating in a resonating manner in the axial direction. If, in this resonating state, the tip 12A of stylus 12 makes contact with the test piece, then the resonating state changes, and this change of state can be detected by monitoring output from the detection means 18.

In precision measurement where micro-configuration is measured by using a touch sensor described above, it is important that measuring force acting between a test piece and the tip of a stylus be controlled below a prescribed value; the test piece and the tip not be damaged; and movement of the stylus tip accurately reflect the surface configuration of the test piece. Accordingly, a probe, which is equipped with a mechanism of controlling the measuring force below a prescribed value, is available.

One example is a probe for a micro-configuration measuring device disclosed in the U.S. patent application Ser. No. 09/805309.

Figure 7:
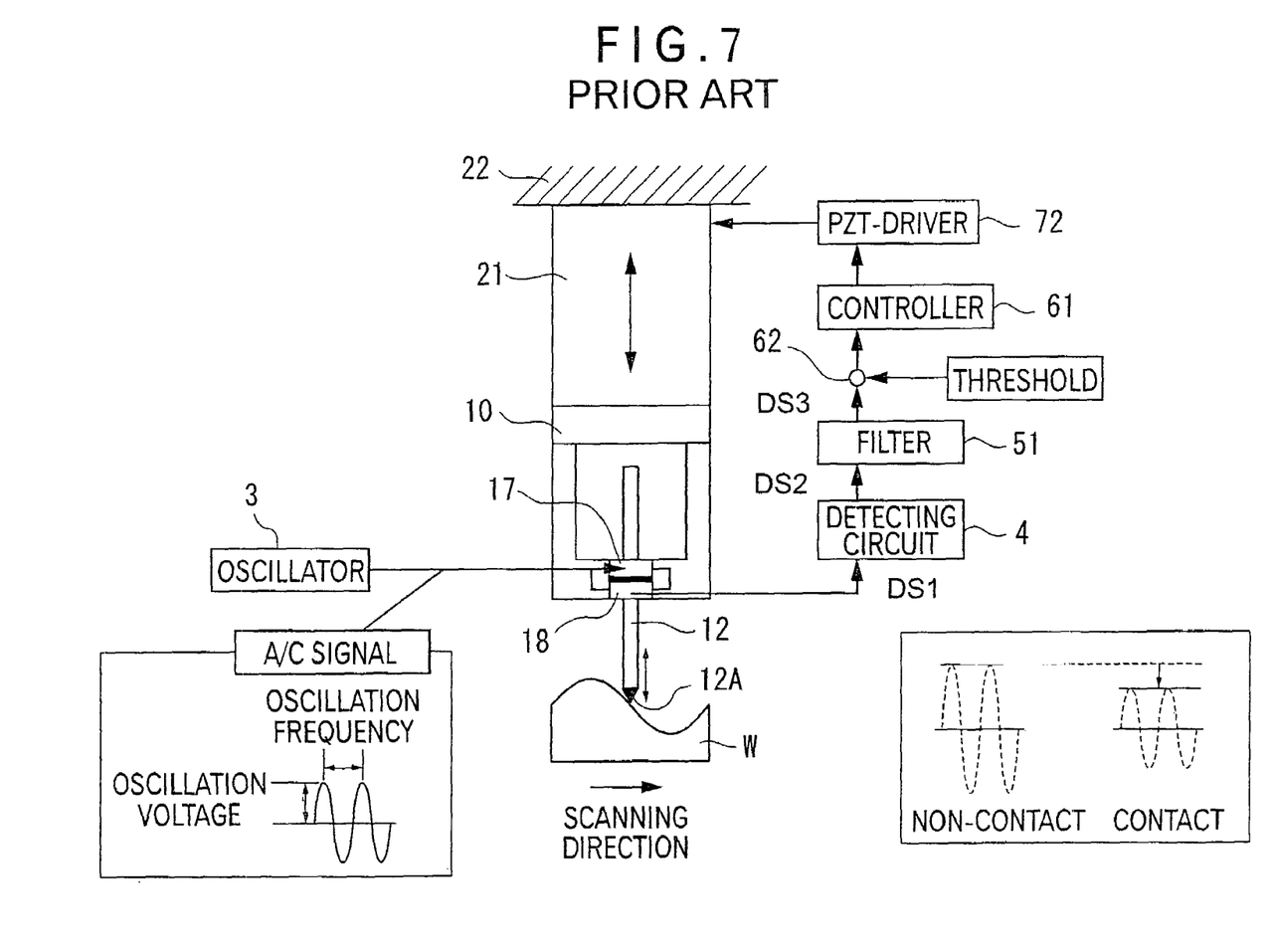
FIG. 7 is a schematic diagram illustrating the control of operation of a conventional touch sensor.

In FIG. 7, this probe for micro-configuration measuring device is made of the above-mentioned touch sensor 10 and a fine motion mechanism 21 using a piezoelectric element (PZT), which are coupled together along the axis of oscillation of the stylus 12 and, as a whole, are attached to a movable support member 22.

Given such a structure, if an electrically alternating signal, which is characterized by the oscillation frequency and the oscillation voltage, are sent from the oscillator 3 to the oscillation means 17, then the stylus 12 starts oscillating in a resonating manner along its axis. If, in this state, the stylus tip 12A makes contact with the test piece W, the resonating state of the stylus 12 changes. Accordingly, by monitoring output from the detection means 18 indicating this change, the contact between the stylus tip 12A and the test piece W can be detected. Output from the detection means 18, which is designated as the detection signal DS1, is sent out to a detecting circuit 4. The detecting circuit 4 converts the detection signal DS1 into the detection signal DS2. The detection signal DS2 is filtered by a filter 51 to remove noises and sent out to a signal processing unit 62 as the detection signal DS3. The signal processing unit 62 computes a difference between the detection signal DS3 and a threshold which determines the measuring force and sends out the result to a controller 61. The controller 61 drives the fine motion mechanism 21 via a PZT driver 72 based on the result received. This system of controlling fine movement described so far allows the detection signal DS3 to be maintained constant with respect to any bumps and dins on the test piece W when the fine motion mechanism 21 and the test piece W are in relative motion for scanning.

In order to be successful in making non-destructive measurement on a test piece such as a silicon wafer, it is important how much the measuring force can be minimized. And, in order to minimize the measuring force, it is necessary that sensitivity of a touch sensor be boosted or the threshold be raised. What was conventionally attempted for the minimization of the measuring force is the boosting of the sensitivity of touch sensors through modification of their structure. However, such modification was not able to produce satisfactory results regarding the performance of micro-configuration measuring devices.

SUMMARY OF THE INVENTION

A principal purpose of the present invention is to provide a touch sensor, which is capable of minimizing measuring force and making non-destructive measurement without damaging micro-configuration of the surface of a test piece.

Here, a relationship between the measuring force and the detection signal DS3 in FIG. 7 will be described.

Figure 1:
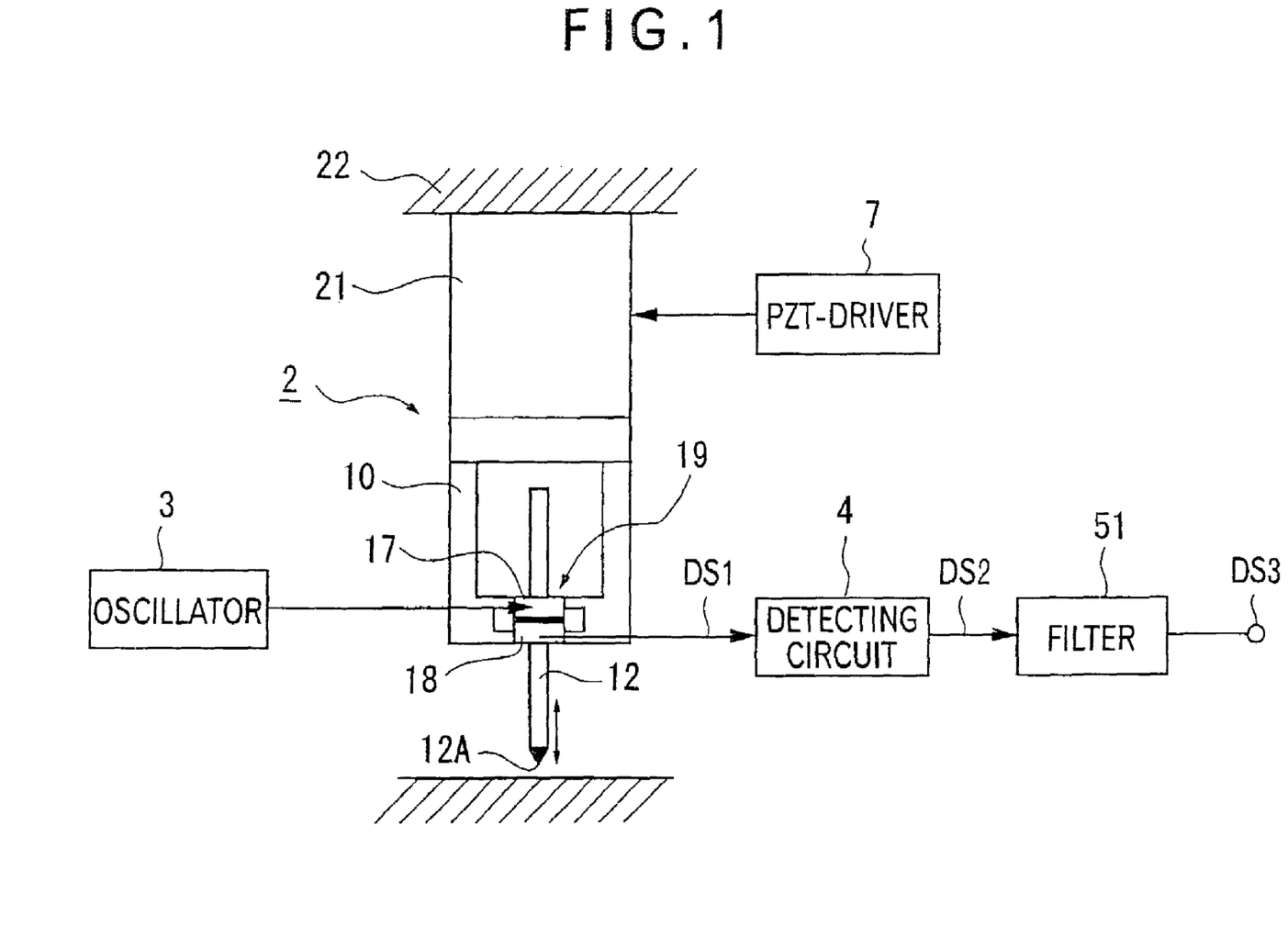
FIG. 1 is a schematic diagram illustrating an experimental setup for describing the workings of the present invention.

FIG. 1 illustrates a setup for an experiment on static characteristics of the detection signal DS3 during contact and non-contact conditions. A constant oscillation frequency is sent out from the oscillator 3 so that the stylus 12 oscillates in the direction of its axis. Then, a drive voltage from the PZT driver 7 is made to gradually increase so that the stylus 12 is brought closer to the test piece W. As the stylus 12 is further brought closer to the test piece W so that the tip 12A of the stylus 12 starts making contact, force inflicted onto the tip 12A gradually increases, and, at the same time, oscillation amplitude of the stylus tip 12A gradually decreases.

Figure 2:
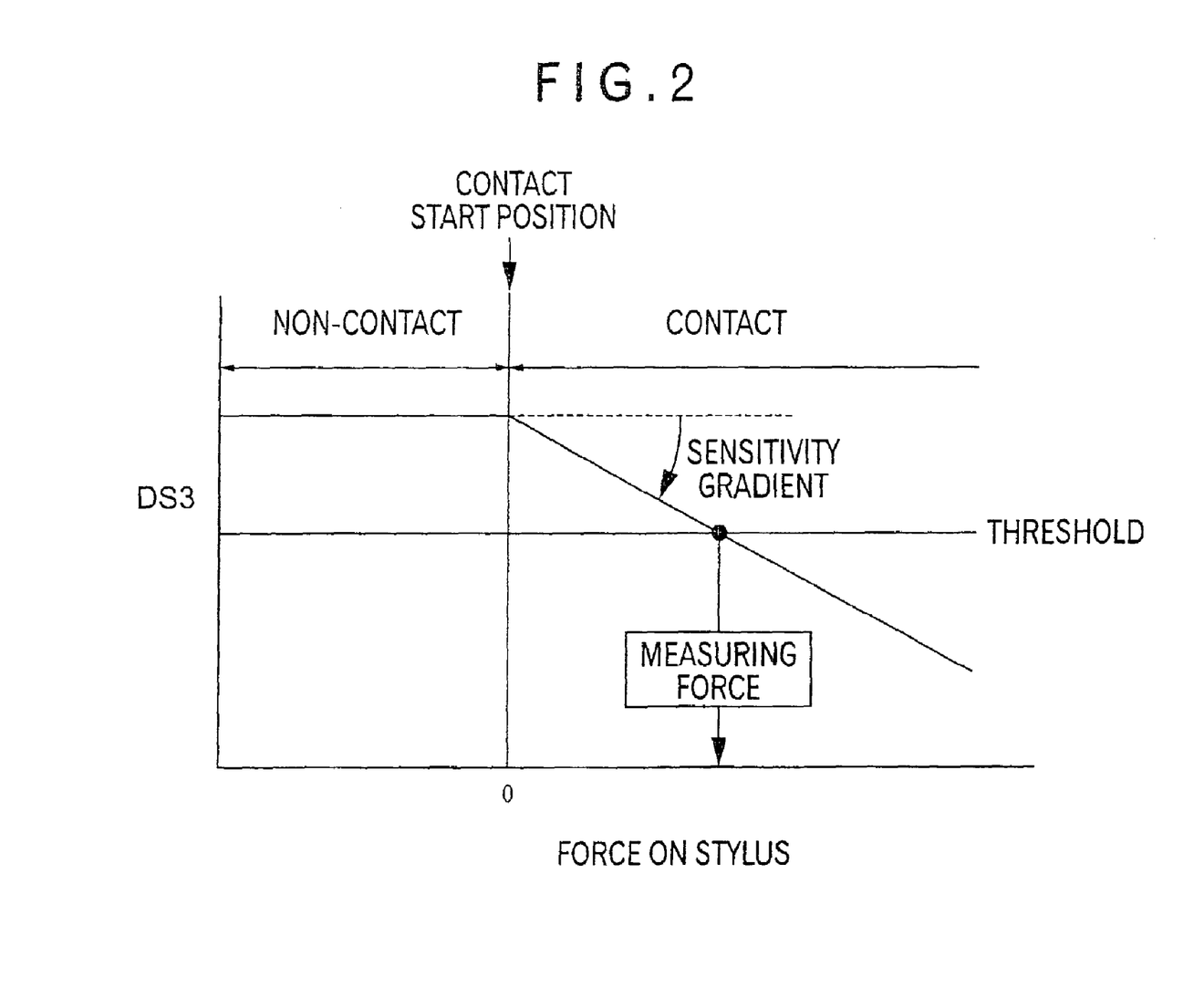
FIG. 2 is a graph illustrating the change of the detection signal for describing the workings of the present invention.

FIG. 2 illustrates a relationship between the force inflicted on the stylus tip 12A (the measuring force) and the detection signal DS3. The horizontal axis and the vertical axis of the graph represent the force inflicted on the stylus tip 12A and the detection signal DS3, respectively. The detection signal DS3 is maximum in the non-contact region. Assuming that where the detection signal DS3 begins decreasing is the point of contact, the force inflicted on the stylus tip 12A increases and the detection signal DS3 decreases, both starting at the point of contact. A slope in this region is called a sensitivity gradient. The higher the sensitivity of the touch sensor is, the steeper the slope of the graph is. From the graph, it can be seen that, since the force on the stylus (the measuring force) is determined by the sensitivity gradient and the threshold, the minimization of the measuring force can be achieved either by boosting the sensitivity gradient or raising the threshold.

In conventional probes for micro-configuration measuring devices, the minimization of the measuring force was attempted by boosting the sensitivity of the touch sensor through modification of its structure. For example, in the touch sensor illustrated in FIG. 6, by designing flexural rigidity of the arms 13, 14, 15 and 16 to be lower than that of the stylus 12 in the axial direction, or by arranging the arms 13, 14, 15 and 16 symmetrically about the axis of the stylus 12, flexural vibration of the stylus 12 with respect to its axis was prevented, thereby increasing the sensitivity of the touch sensor 10. Since the sensitivity gradient becomes steeper for such design or arrangement, the force on the stylus tip 12A (the measuring force) can be minimized, accordingly.

An inventor of the present invention has conceived an idea that by adjusting the oscillator which sends out an electrically alternating signal to an oscillation electrode or by adjusting the detecting circuit which detects changes of oscillation as the stylus tip touches the test piece, the above-mentioned purpose can be achieved, instead of modifying the structure of the touch sensor so that it has a steep sensitivity gradient. Specific structure thereof is as follows.

In the present invention, a touch sensor includes a stylus tip which makes contact with a test piece; a piezoelectric element for oscillating the stylus tip; an oscillator for oscillating the piezoelectric element; and a detecting circuit for detecting a change of a quantity of state which occurs when the stylus tip and the test piece make contact. This touch sensor is characterized in that, by adjusting an electrically alternating signal from the oscillator, a measuring force produced between the stylus tip and the test piece upon contact can be adjusted.

According to the present invention, the strength of the measuring force is adjusted by adjusting the electrically alternating signal from the oscillator. For example, if the oscillation voltage is reduced, then the sensitivity gradient becomes steeper, thereby adjusting the measuring force. Incidentally, it is clear from the result (FIG. 4) to be described later that by reducing the oscillation voltage, the sensitivity gradient can be made steeper. For example, assuming that the measuring force is constant, a degree of attenuation for the detection signal is greater, i.e., the sensitivity gradient is steeper when the oscillation voltage is small and the force for oscillation is small. Therefore, there is no need to modify the structure of the touch sensor for steeper sensitivity gradient and greater sensitivity as was done conventionally. This promises the possibility of breaking through the limit of minimization of the measuring force through the improvement of sensitivity of the touch sensor.

Moreover, since the adjustment of the measuring force is done by adjusting the electrically alternating signal from the oscillator, the present invention can be implemented by using a touch sensor equipped with a conventional stylus, thereby greatly improving the general versatility.

In the present invention, the adjustment of the electrically alternating signal is preferably accomplished by adjusting at least one from the group including the oscillation voltage, the oscillation frequency and the oscillation phase.

The adjustment of the measuring force can be done by adjusting the electrically alternating signal, specifically, by adjusting the oscillation voltage from the oscillator, by displacing the oscillation frequency from the resonance frequency of the stylus, or by adjusting the oscillation phase.

In the present invention, the measuring force can preferably be adjusted by monitoring any one from the group including the electrically alternating signal, the quantity of state in the detecting circuit, and an oscillating amplitude of the stylus tip.

Given such a structure, if a relationship among the measuring force, the electrically alternating signal and the threshold is known in advance, then monitoring any one from the group including the electrically alternating signal, the quantity of state in the detecting circuit and the oscillation amplitude of the stylus tip allows the measuring force to be adjusted both closely and precisely.

In the present invention, a touch sensor preferably further includes a low-pass filter in the detecting circuit, and the measuring force can be adjusted by adjusting the electrically alternating signal and the time constant of the low-pass filter based on a prescribed relationship.

Given such a structure where the low-pass filter has been added, noise added to the quantity of state in the detecting circuit during contact and non-contact conditions can be reduced. Accordingly, the threshold can be raised above a prescribed value and the measuring force can be adjusted, i.e., reduced. Moreover, by adjusting the electrically alternating signal and the time constant of the low-pass filter based on a prescribed relationship, an increase of noise due to the adjustment of the electrically alternating signal can be prevented through the adjustment of the time constant of the low-pass filter. Accordingly, the measuring force can be adjusted with the threshold being raised above a prescribed value, thereby reducing the measuring force.

In the present invention, the above-mentioned prescribed relationship is preferably an inverse proportionality between the oscillation voltage of the electrically alternating signal and the time constant of the low-pass filter.

Given such a structure, since the oscillation voltage of the electrically alternating signal is inversely proportional to the time constant of the low-pass filter, fluctuations in the noise can easily be predicted from the oscillation voltage of the electrically alternating signal. Furthermore, by determining the time constant of the low-pass filter, the measuring force can efficiently be adjusted.

In the present invention, the adjustment of the time constant of the low-pass filter is preferably automatically performed based on the above-mentioned prescribed relationship.

Given such a structure, since the time constant of the low-pass filter is automatically adjusted based on the above-mentioned prescribed relationship, by utilizing such prescribed relationship, the time constant of the low-pass filter can automatically be determined from the electrically alternating signal, thereby adjusting the measuring force.

DETAILED DESCRIPTION OF THE PREFERRED EMBODIMENTS

One embodiment of the present invention will be described in the following paragraphs with reference to the attached figures. In the following description, it will be understood that the same or similar parts as those already described will be designated by the same numerals or similar terms with their descriptions being omitted or given only briefly.

Figure 3:
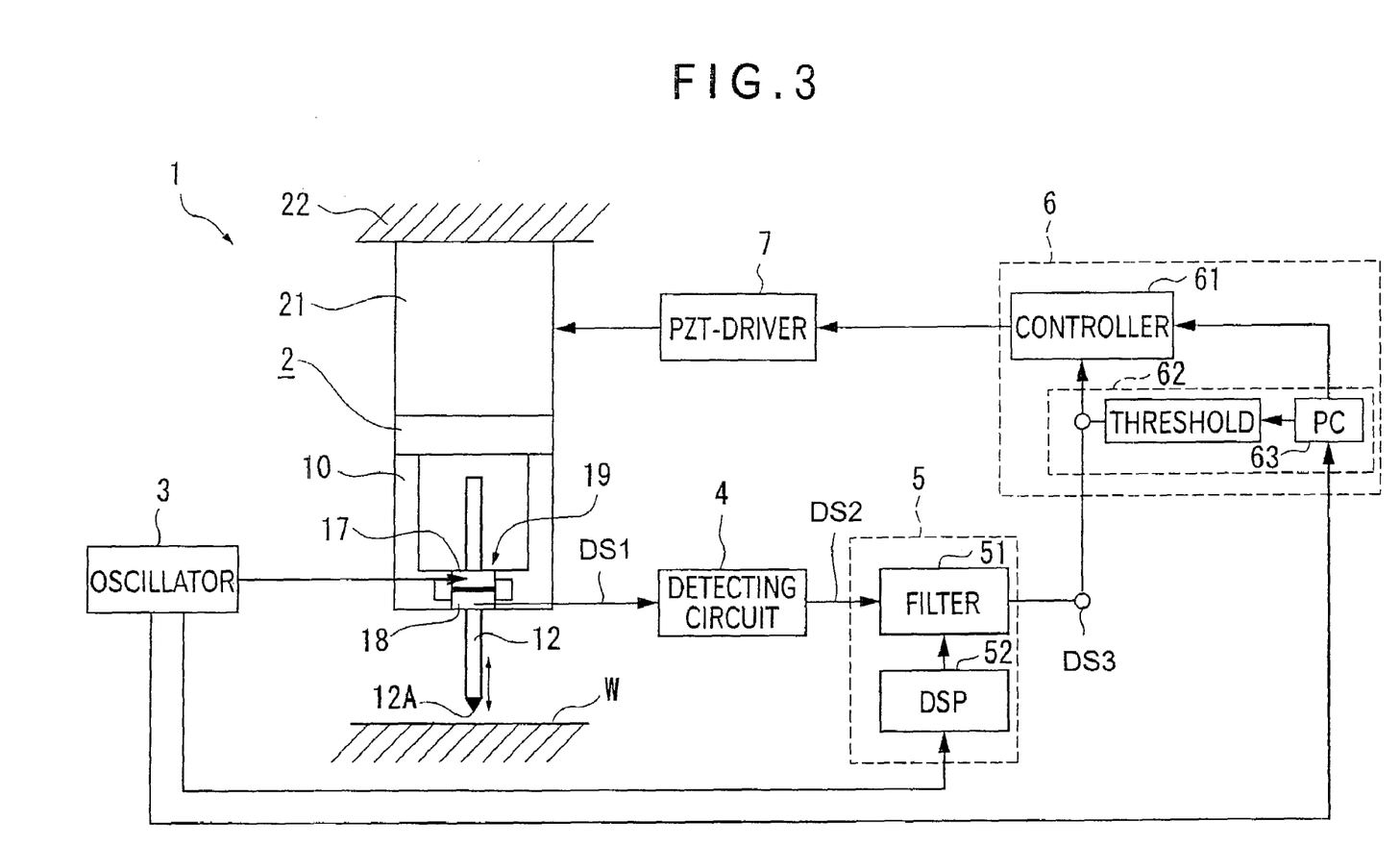
FIG. 3 is a schematic diagram illustrating one embodiment of a touch sensor according to the present invention.

FIG. 3 illustrates a probe 1 for a micro-configuration measuring device having an operation control structure for a touch sensor according to the present invention.

This probe 1 for a micro-configuration measuring device includes a probe body 2, an oscillator 3, a detecting circuit 4, an adjustor unit 5, a fine motion mechanism controller 6 and a PZT driver 7.

The probe body 2, which acts on a test piece W and measures its surface configuration, includes a touch sensor 10 with a stylus tip 12A which touches the test piece W and a fine motion mechanism 21 which moves the stylus tip 12A in the up-and-down direction (in the direction of the height with respect to the surface of the test piece W).

The touch sensor 10 has the same structure as the one illustrated in FIG. 6 previously described. The piezoelectric element 19 has an oscillation electrode and a detection electrode, whose illustrations are omitted in the figure. The oscillation electrode has a lead wire attached thereto which supplies an oscillation voltage, constituting an oscillation means 17, and the detection electrode has a lead wire attached thereto which picks up a detection signal, constituting a detection means 18.

The fine motion mechanism 21 is made of a plurality of thin films of piezoelectric device (PZT) and is placed along the axis of the stylus in a continuous manner between the support member 22 and the touch sensor 10.

The oscillator 3 includes a transmitter which generates an electrical signal for the oscillation means 17 to be operated at prescribed amplitudes and frequencies. The amplitudes and frequencies can be adjusted to assume appropriate values.

Given such a structure, if a prescribed signal is sent from the oscillator 3 to the oscillation means 17, then the stylus 12 starts oscillating in a resonating manner along its axis. However, if the tip 12A of the stylus 12 makes contact with the test piece W, then the state of resonance changes. This change is detected by the detection means 18, and a signal is sent out to the fine motion mechanism controller 6 via the detecting circuit 4 and the adjustor unit 5.

The adjustor unit 5, which is responsible for removing noise which has been added to the detection signal DS2 sent out from the detecting circuit 4, includes a low-pass filter 51 and a digital signal processor (DSP) 52 which controls the time constant of the filter 51.

The DSP 52 receives an electrically alternating signal from the oscillator 3, performs computations based on a correlation between the electrically alternating signal and the time constant, sends out the results to the filter 51, and adjusts the time constant of the filter 51. Specifically, it adjusts the time constant of the filter 51 in response to the electrically alternating signal from the oscillator 3 so that the frequency band for the noise and the pass band of the filter 51 are adjusted, thereby reducing effects of the noise which has been superimposed on the detection signal DS2.

The fine motion mechanism controller 6, which receives the detection signal DS3 sent out from the adjustor unit 5 and controls the operation of the fine motion mechanism 21 via the PZT driver 7, includes a controller 61 and a signal processing unit 62.

The signal processing unit 62, which is equipped with a personal computer 63 which sets a threshold (a value which determines the measuring force) based on the electrically alternating signal from the oscillator 3, computes a difference between the detection signal DS3 sent out from the adjustor unit 5 and the threshold, and sends the result out to the controller 61.

The controller 61 controls the operation of the fine motion mechanism 21 of the probe body 2 based on the signal from the signal processing unit 62. Such control of the operation of the fine motion mechanism 21 is done via the PZT driver 7 in such a manner that the measuring force which is computed from the detection signal DS3 from the adjustor unit 5 and the above-mentioned threshold be constant.

Next, the operation of the previously mentioned probe 1 for a micro-configuration measuring device will be described.

First, the personal computer 63 sends out a control signal to the controller 61, which in turn sends out a signal to the PZT driver 7 to actuate the fine motion mechanism 21, so that the stylus tip 12A is prompted to make contact with the test piece W with a prescribed amount of the measuring force. Here, determination of whether a prescribed amount of the measuring force is exerted or not is made by monitoring whether the detection signal DS3, which originates in the detecting circuit 4 and goes through the adjustor unit 5 assumes a prescribed threshold or not while the stylus 12 is made oscillating along its axis by the oscillator 3.

A scan of the surface of the test piece W is performed by moving the stylus 12 of the probe body 2 with respect to the test piece W. When the surface of the test piece W is being scanned, if the detection signal DS3 from the detecting circuit 4 becomes large compared to its original value, then a bend of the surface of the test piece W in such a manner that the stylus tip 12A is departing away from the surface is suspected. Consequently, based on this change in the state of the detection signal DS3, the controller 61 sends out a control signal which operates the fine motion mechanism 21 in such a manner that the stylus tip 12A is prompted into the direction of closing in on the surface of the test piece W. On the other hand, if the detection signal DS3 becomes small compared to its original value, then a bend of the surface of the test piece W in such a manner that the stylus tip 12A is closing in on the surface is suspected. Consequently, the controller 61 sends out to the fine motion mechanism 21 a control signal, which prompts the stylus tip 12A into the direction of departing away from the surface of the test piece W.

During the operation described in the above paragraph, if the control by the controller 61 is performed in such a manner that the change in the quantity of state of the detection signal DS3 is minimized, then the stylus 12 can maintain a constant measuring force toward the test piece W. In the case where the stylus tip 12A is not in contact with the test piece W, the non-contact of the stylus tip 12A with the test piece W can be detected by observing a fact, as shown in FIG. 2, that an amplitude of the detection signal DS3 assumes its maximum value or that the state of the detection signal DS3 does not change even if the stylus 12 is moved up and down by operating the fine motion mechanism 21.

Next, a method for adjusting the measuring force of the probe 1 for a micro-configuration measuring device mentioned above will be described.

Figure 4:
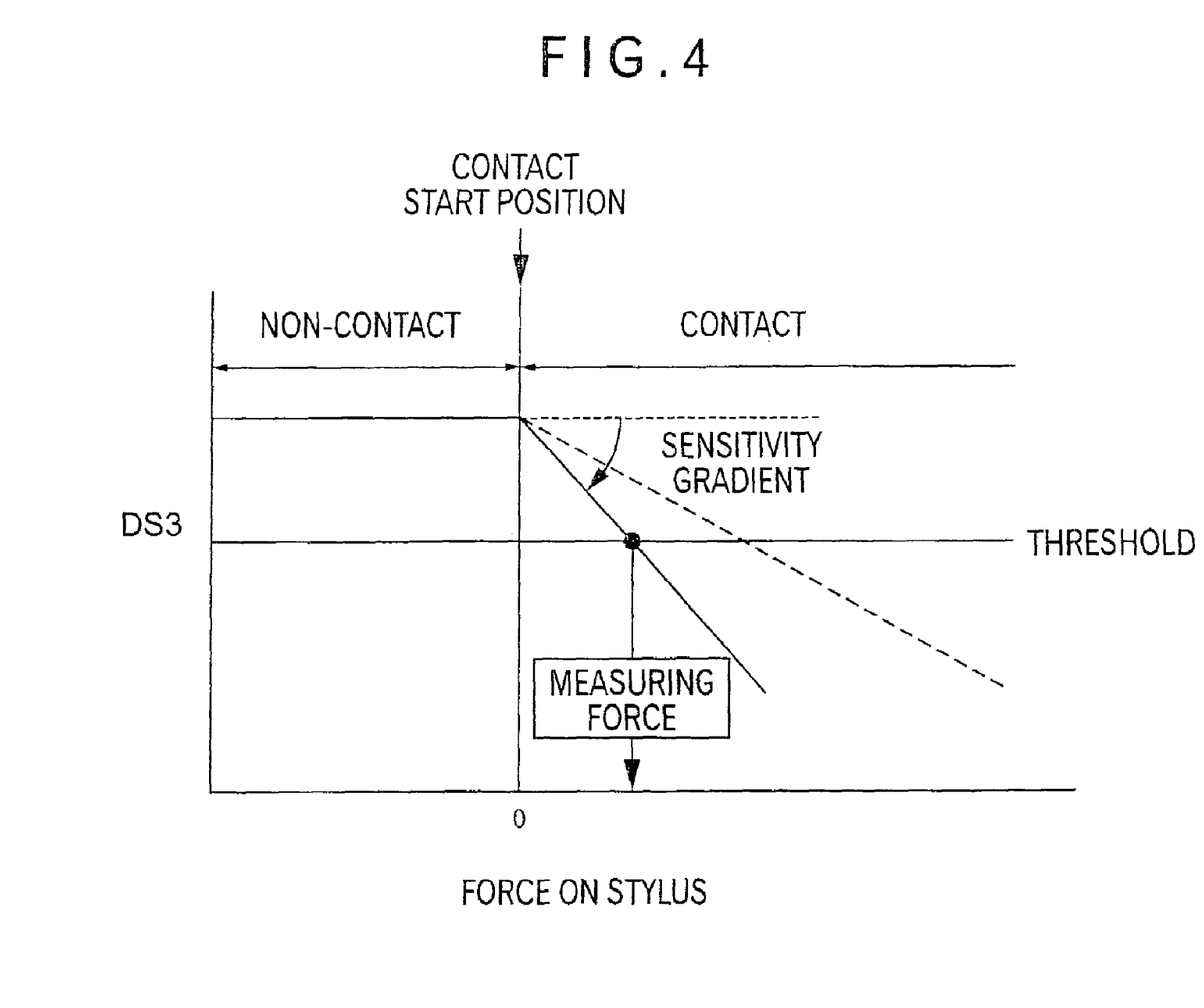
FIG. 4 is a graph illustrating the change of the detection signal for describing the workings of the embodiment of FIG. 3.

As previously described, the measuring force is determined by the sensitivity gradient and the threshold. The sensitivity gradient becomes steeper as shown in FIG. 4 as the oscillation voltage of the electrically alternating signal to be added to the oscillation means 17 from the oscillator 3 is reduced.

First, the oscillation voltage of the transmitter in the oscillator 3 is set at a small value. Then, this oscillation voltage is applied to the oscillation means 17 so that the stylus 12 starts oscillating in its axial direction. The detection means 18 detects the oscillation of the stylus 12 and sends out the detection signal DS1, which is then converted into the detection signal DS2 representing the changes of the oscillation by the detecting circuit 4.

Here, the oscillator 3 sends out the oscillation voltage of the electrically alternating signal to the DSP 52 of the adjustor unit 5. Then, the DSP 52, considering a fact that the oscillation voltage and the time constant of the filter 51 are inversely proportional to each other, computes the time constant of the filter 51 based on the oscillation voltage and sends out the result to the filter 51, thereby setting the time constant of the filter 51. The detection signal DS2 that was sent out from the detecting circuit 4 passes through the filter 51 and becomes the detection signal DS3 whose noise components have been removed. Specifically, as the oscillation voltage of the electrically alternating signal decreases, an amount of noise added to the detection signal DS2 sent out from the detecting circuit 4 increases. If the noise increases, then the range of adjusting the threshold, which determines the measuring force, becomes limited, requiring that the threshold be set at a value smaller than before. Therefore, by raising the time constant of the filter 51, the pass band is narrowed and the effect of the noise is reduced, so that the adjustment of the threshold can freely be made.

Furthermore, the oscillator 3 sends out the oscillation voltage of the electrically alternating signal to the personal computer 63 of the signal processing unit 62. Then, the personal computer 63, considering the previously obtained relationship among the measuring force, the oscillation voltage and the threshold, sets the threshold based on the oscillation voltage. As described above, since raising the time constant of the filter 51 can reduce the noise and, therefore, eliminate the limitations on the threshold, the threshold can be set at a value higher than before as illustrated in FIG. 5.

Figure 5:
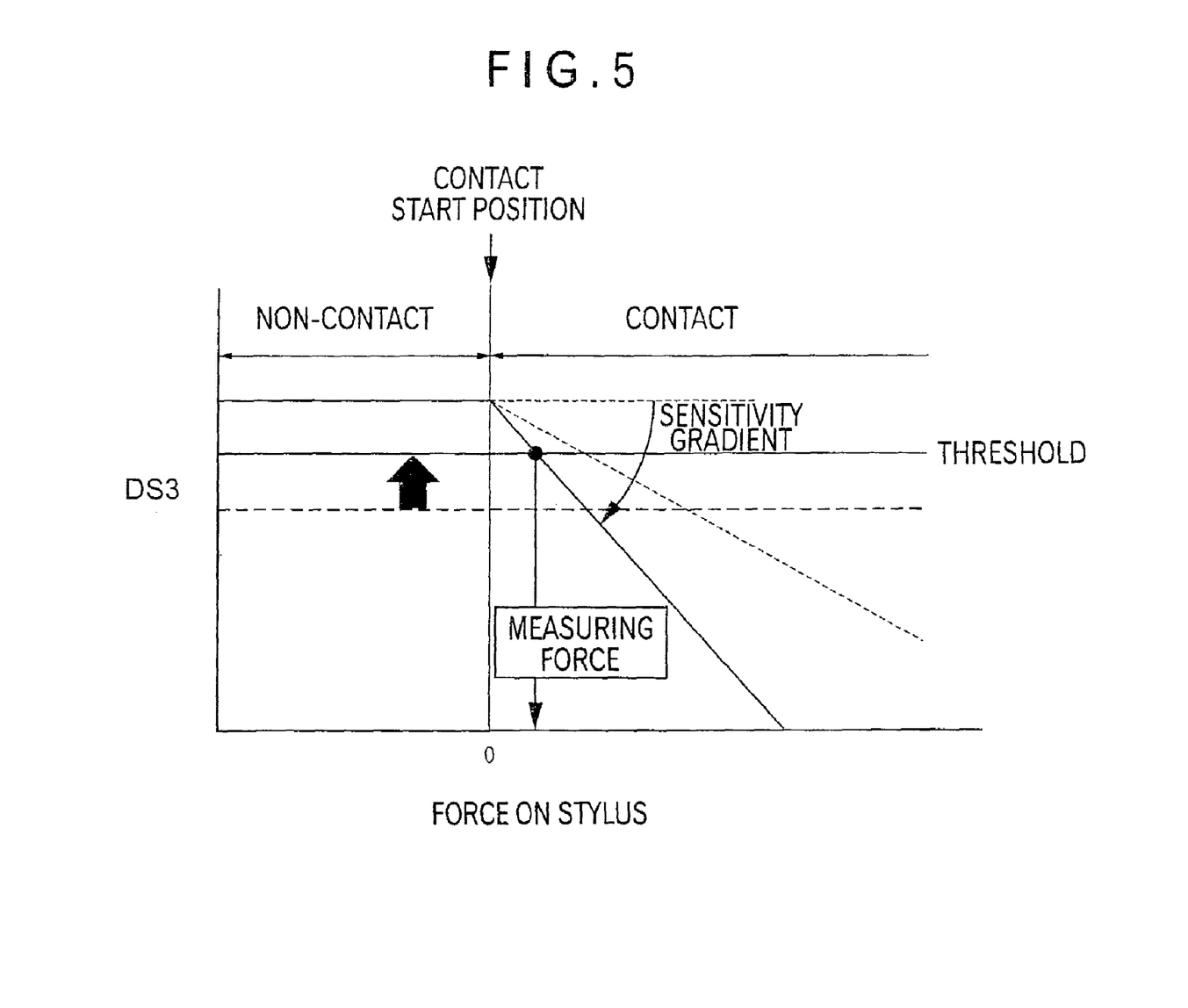
FIG. 5 is a graph illustrating the change of the detection signal for describing the workings of the embodiment of FIG. 3.

Given the procedures described in the above paragraphs, the measuring force can be made smaller than before as illustrated in FIG. 5. This reduces the force produced between the stylus tip 12A and the test piece W upon their contact, thereby preventing possible damage on the surface of the test piece W.

According to the present embodiment described above, following effects can be obtained.

(1) Since the controller 61 controls the operation of the fine motion mechanism 21 in such a manner that it is either closing in or departing away with respect to the test piece W upon monitoring the change of the quantity of state of the detection signal DS3, the probe 1 for a micro-configuration measuring device can always be operated with the stylus tip 12A touching the surface of the test piece W with a constant measuring force, and measurement by the probe 1 can be carried out with great precision.

(2) Since the adjustment of the measuring force produced between the stylus tip 12A and the test piece W upon touching is implemented by adjusting the oscillation voltage of the electrically alternating signal, not by modifying the structure of the touch sensor, touch sensors which include conventional oscillation means and detection means can be used, thereby implementing the present invention with touch sensors of a variety of shapes and sizes.

(3) Since the detection signal DS2 sent out from the detecting circuit 4 passes through the filter 51, noise added to the detection signal DS2 can be removed, and the threshold in the signal processing unit 62, whose range of adjustment is conventionally limited, can be adjusted over a wide range of values, thereby adjusting the amount of the measuring force.

(4) Since the DSP 52 adjusts the time constant of the filter 51, the time constant of the filter 51 can be adjusted depending on the noise added to the detection signal DS2, i.e., the oscillation voltage from the oscillator 3. Since the noise added to the detection signal DS2 sent out from the detecting circuit 4 is removed, a range of adjusting the threshold as well as a range of adjusting the measuring force can be widened.

(5) The signal processing unit 62 is equipped with the personal computer 63 which monitors the oscillation voltage from the oscillator 3. Therefore, with the measuring force, the oscillation voltage and the threshold being determined in advance, the threshold can be set in accordance with the oscillation voltage by monitoring the oscillation voltage from the oscillator 3, thereby adjusting the measuring force.

(6) By adjusting the oscillation voltage of the electrically alternating signal and the threshold, and by adjusting the operation of the fine motion mechanism 21 by the controller 61, the measurement of the surface with small and constant measuring force can be performed.

It should be understood that the present invention is not limited to the aforementioned embodiment and that any changes and modifications made within the spirit and scope of the present invention be also included therein.

For example, although, in the aforementioned embodiment, the stylus 12 of the touch sensor 10 of the above embodiment oscillates in a resonating manner in the direction of its axis, any touch sensor including the stylus which is oscillated by a piezoelectric element and the detecting circuit which detects the change of the quantity of state between the stylus tip and the test piece upon contact can be used. That is, those of the type which utilizes flexural oscillation generally used in atomic force microscopes (AFM) can be used.

Although, in the aforementioned embodiment, the measuring force is adjusted by changing the oscillation voltage of the electrically alternating signal applied to the touch sensor 10, it is also possible that the measuring force can be adjusted by changing oscillation frequencies or oscillation phases. For example, such adjustment can also be done by displacing the oscillation frequency from the resonance frequency of the stylus, not equating the two. Furthermore, in the case where an oscillator uses a self-exciter with a phase adjusting capability instead of a transmitter, the measuring force may be adjusted by adjusting the oscillating phase.

In the aforementioned embodiment, a relationship between the measuring force and oscillation voltage and the threshold is obtained in advance. Then, by monitoring the oscillation voltage of the electrically alternating signal by the personal computer 63, the threshold is set and the measuring force is adjusted. However, the measuring force may be adjusted by monitoring the quantity of state of the detecting circuit or the oscillation amplitude of the stylus tip.

What is claimed is:

1. A method of measuring the configuration of an object, said method comprising the steps of:

contacting a surface of the object with a stylus tip;
generating an electrical oscillation signal;
oscillating the stylus tip in response to the oscillation signal;
moving the stylus tip over the surface of the object;
adjusting the oscillation signal so that a measuring force between the stylus tip and the object is adjusted;
generating a detection signal representative of resonance changes in the stylus tip, wherein the resonance changes are indicative of a measuring force between the stylus tip and the object, wherein the step of generating the detection signal comprises the steps of generating an initial detection signal and then filtering the initial detection signal to remove noise, wherein the filtering is performed using a time constant; and,
adjusting the time constant based on a predetermined relationship with the oscillation signal.

2. The method of claim 1, wherein the step of adjusting the oscillation signal comprises adjusting at least one of an oscillation voltage, an oscillation frequency and an oscillation phase.

3. The method of claim 2, wherein the step of adjusting the oscillation signal comprises adjusting the oscillation voltage.

4. The method of claim 1, further comprising the step of monitoring one of the oscillation signal, the detection signal, and an oscillation amplitude of the stylus tip when the measuring force is adjusted.

5. The method of claim 4, wherein the monitoring step comprises monitoring an oscillation voltage of the oscillation signal.

6. The method of claim 1, wherein the prescribed relationship is an inverse proportionality between an oscillation voltage of the oscillation signal and the time constant.

7. A method of measuring the configuration of an object, said method comprising the steps of:

contacting a surface of the object with a stylus tip;
generating an electrical oscillation signal;
oscillating the stylus tip in response to the oscillation signal;
moving the stylus tip over the surface of the object;
generating a detection signal representative of resonance changes in the stylus tip, wherein the resonance changes are indicative of a measuring force between the stylus tip and the object;
determining a threshold value for the measuring force between the stylus tip and the object based on the oscillation signal;
determining the difference between the threshold value and the detection signal;
generating a difference signal representative of the difference between the threshold value and the detection signal;
controlling the movement of the stylus tip based on the difference signal;
adjusting the oscillation signal to adjust the threshold value and, thus, the measuring force between the stylus tip and the object.

8. The method of claim 7, wherein the step of adjusting the oscillation signal comprises adjusting at least one of an oscillation voltage, an oscillation frequency and an oscillation phase.

9. The method of claim 8, wherein the step of adjusting the oscillation signal comprises adjusting the oscillation voltage.

10. The method of claim 7, wherein the step of controlling the movement of the stylus tip comprises moving the stylus tip toward and away from the surface of the object.

11. The method of claim 7, wherein the step of generating the detection signal comprises the steps of generating an initial detection signal and then filtering the initial detection signal to remove noise, wherein the filtering is performed using a time constant.

12. The method of claim 11, further comprising the step of adjusting the time constant based on a predetermined relationship with the oscillation signal.

13. The method of claim 12, wherein the prescribed relationship is an inverse proportionality between an oscillation voltage of the oscillation signal and the time constant.

* * * * *